United States Patent [19]

Pianka

[11] 3,714,230
[45] Jan. 30, 1973

[54] DINITROPHENYL ESTER PESTICIDES
[75] Inventor: Max Pianka, St. Albans, England
[73] Assignee: The Murphy Chemical Company Limited, Wheathampstead, St. Albans, England
[22] Filed: July 24, 1969
[21] Appl. No.: 844,627

[52] U.S. Cl. ............. 260/479 S, 71/106, 424/313
[51] Int. Cl. ....C07c 69/34, C07c 69/40, C07c 69/60
[58] Field of Search ............................ 260/479 S

[56] References Cited

UNITED STATES PATENTS 3,123,522  3/1964  Scherer et al. ............... 260/479

FOREIGN PATENTS OR APPLICATIONS 999,876  7/1965  Great Britain ................ 260/479

Primary Examiner—James A. Patten
Attorney—Bacon and Thomas

[57] ABSTRACT

2-Butyl-4,6-dinitrophenyl and e.g. alkyl mixed esters of aliphatic dicarboxylic acids, the esters having pesticidal activity including insecticidal and selective herbicidal activities.

17 Claims, No Drawings

DINITROPHENYL ESTER PESTICIDES

This invention relates to novel dinitrophenyl esters and to compositions prepared therefrom.

It has been found that certain novel dinitrophenyl esters have activities which make them of use in the fields of agriculture, horticulture and veterinary medicine. In particular, they have been found to show one or more of the following activities: herbicidal, insecticidal, acaricidal, aphicidal, fungicidal and nematicidal. The dinitrophenyl esters of the invention have the following structure:-

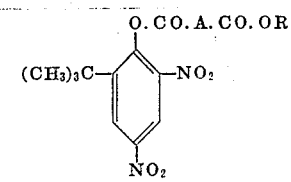

in which A is $-CH=CH-$ or $-(CH_2)_n-$ where $n$ is 0, or an integer from 1 to 6 and R is cyclic or acyclic, saturated or unsaturated aliphatic group which may be substituted with one or more of the following substituents: halogen atoms, nitro groups, amino groups, substituted amino groups, hydroxyl groups, carboxy or carbalkoxy groups, alkoxy or alkylthio groups, xanthyl groups and heterocyclic groups, or R is an unsubstituted or ring-substituted heterocyclic, araliphatic or aryl group (including 2-t-butyl-4,6-dinitrophenyl), with the provisos that R is not methyl when A is $-CH=CH-$, and R is not 2-t-butyl-4,6-dinitrophenyl when $n$ is 0. The invention also includes acid addition salts with inorganic or organic acids and salts with bases where appropriate.

R may, for example, be an alkyl group having 1 to 18, preferably 1 to 12 carbon atoms, such as methyl, ethyl, propyl isopropyl, butyl, octyl or decyl.

Compounds of the formula I may be prepared by reacting 2-t-butyl-4,6-dinitrophenol, or a functional derivative (e.g. an alkali metal salt) thereof, with an acylating derivative of an acid of the formula $$R.O.CO.A.CO_2H \quad II$$

wherein R and A have the meanings defined above. Suitable acylating derivatives are acyl halides, especially chlorides, and anhydrides. An acid binding agent, such as pyridine, dimethylaniline or an alkali metal carbonate is preferably present in the reaction mixture. A solvent, such as diethyl ether, benzene or tetrahydrofuran, may be present if desired. When an alkali metal salt of the phenol is used, acetone or other ketone is a suitable solvent.

Compounds of the formula I particularly in which R is an alkyl group having 1 to 12 carbon atoms have a marked herbicidal activity, and may be used as total or selective herbicides. For example, compounds in which $-CO.A.CO.OR$ is ethyl fumaryl, methyl succinyl, methyl oxalyl or ethyl oxalyl may be used as selective herbicides on wheat and sugar beet crops. A pre-emergence application at the rate of 4.48 kg/ha gives good control of shepherds purse, groundsel and chickweed without damage to the crop. The propyl fumaryl compound gives similar weed control in rice at a rate of 3.36 kg/ha (post-emergence application). Rates of application are typically 1.12–11.2, preferably 2.24–5.6 kg/ha. Various modes of application, including pre- and post-emergence and soil incorporation, may be used.

Compounds of formula I particularly in which R is an alkyl group containing 1–12 carbon atoms are also notable for their nematicidal activity, and are thus potentially useful for the control of nematodes in soil and elsewhere. Examples of compounds having significant nematicidal activity are the isopropyl, pentyl, hexyl, heptyl and octyl fumarates, and the n-propyl and n-butyl succinates.

Compounds of formula I particularly those where R is an alkyl group containing 1–12 carbon atoms are active against economically important insects e.g. *Lucilia sericata*, *Boophilus decoloratus*, *Aedes aegypti* and *Musca domestica* rendering the compounds useful for the control of insect pests in the agricultural, veterinary, horticultural and domestic fields. The compounds may also be of interest for the control of acaridae.

Examples of compounds possessing this activity include the butyl, iso-butyl, hexyl and heptyl fumarates, the methyl succinate and the ethyl oxalate.

In view of the above-mentioned activities, the invention also provides a herbicidal, nematicidal, insecticidal or acaricidal composition comprising a compound of formula I in combination with a suitable carrier or diluent. The carrier may be liquid or solid and designed to aid the application of the compound either by way of dispersing it where it is to be applied or to provide a formulation which can be made by the user into a dispersible preparation.

Liquid preparations thus include preparations of the compound in the form of solutions or emulsions, for example in non-aqueous solvents, which can be used on their own or be adapted to be made up with water or other diluents to form sprays etc; in such cases the carrier is a solvent or emulsion base free of undesirable toxicity under the conditions of use. Generally such preparations will include a wetting, dispersing or emulsifying agent. Aerosol packs may be prepared by using a gaseous or low-boiling propellant to expel the active compound or a solution thereof.

Solid preparations include dusts and wettable powders, granules, pellets and semi-solid preparations in the form of pastes. Such preparations may include inert solid or liquid diluents such as clays, which may themselves have wetting properties, and/or emulsifying, wetting or dispersing agents; binding and/or adhesive agents may also be included. Solid preparations also include thermal fumigating mixtures wherein the compound is associated with a solid pyrotechnic composition such as a mixture of clay, lactose and potassium chlorate.

Compositions of particular importance are those suitable for preparing dips, sprays or drenches for external application to livestock, especially cattle for the control of parasitic insects such as ticks. Such compositions are suitably of the self-emulsifying liquid type in which the compound is associated with a non-aqueous carrier and an emulsifying or dispersing agent.

For the better understanding of the invention, the following examples are given by way of illustration only.

EXAMPLE 1

Preparation of 2-t-butyl-4,6-dinitrophenyl-n-pentyl fumarate

A. Preparation of n-pentyl fumaryl chloride

Maleic anhydride (39.2 g., 0.4 mole) and pentan-1-ol (35.2 g., 0.4 mole) were mixed at room temperature. After standing overnight the mixture was heated for 30 min. on a steam-bath. A solution of thionyl chloride (37.5 ml.), in benzene (40 ml.), was added and the resulting solution was heated under reflux for 18 hr., then distilled to give pentyl fumaryl chloride (61.4 g.), $n^{20}{}_D$ 1.4569.

The other chlorides specified in Table I below were prepared similarly, except for ethyl fumaryl chloride and propyl fumaryl chloride, for whose preparation a large excess of the appropriate alcohol was used.

TABLE I

| Name of compound | Boiling point °C/mm | refractive index $n_D^{20}$ |
|---|---|---|
| ethyl fumaryl chloride | 90–92/19 | |
| propyl fumaryl chloride | 96–98/14 | |
| butyl fumaryl chloride | 113–115/14 | 1.4590 |
| pentyl fumaryl chloride | 127–130/12 | 1.4569 |
| hexyl fumaryl chloride | 139–141/12 | 1.4580 |
| heptyl fumaryl chloride | 147–150/12 | 1.4582 |
| octyl fumaryl chloride | 157–160/12 | 1.4562 |
| nonyl fumaryl chloride | 138–140/2.0 | 1.4626 |
| decyl fumaryl chloride | 150–152/4.0 | 1.4630 |
| undecyl fumaryl chloride | 160–162/1.0 | 1.4630 |
| dodecyl fumaryl chloride | 174–176/2.5 | 1.4645 |
| s-butyl fumaryl chloride | 122–124/13 | 1.4540 |
| isobutyl fumaryl chloride | 118–120/11 | 1.4555 |

B. Reaction of n-pentyl fumaryl chloride with 2-t-butyl-4,6-dinitophenol 2-t-Butyl-4,6-dinitrophenol (16.8 g., 0.07 mole), potassium carbonate (4.93 g.) and acetone (70 ml.) were heated under reflux for 30 min. The resulting mixture was stirred and cooled to 0° and n-pentyl fumaryl chloride (14.3 g., 0.07 mole) was added dropwise keeping the temperature between 0° and 5°. The reaction mixture was then heated under reflux for 1½ hr., cooled, and filtered. The volatile components of the filtrate were distilled off at 10–20 mm. on a steam-bath and the residue was shaken with benzene and 2N-sodium carbonate. The benzene solution was separated, washed with water, dried over sodium sulphate and the volatile components distilled off at 10–20 mm. on a steam-bath. The residue was crystallized from methanol to give 2-t-butyl-4,6-dinitrophenyl n-pentyl fumarate as fine white needles (13.2 g.), m.p. 69°–70° (Found: N, 6.9, $C_{19}H_{24}N_2O_8$ requires N, 6.9%).

The other alkyl fumarates listed in Table II were prepared similarly, using the appropriate alkyl fumaryl chlorides.

EXAMPLE 2

Preparation of 2-t-butyl-4,6-dinitrophenyl n-propyl succinate 2-t-Butyl-4,6-dinitrophenol (14.4 g., 0.06 mole), potassium carbonate (4.23 g.) and acetone (70 ml.) were heated under reflux for 30 min. The resulting mixture was cooled to 0° and n-propyl succinyl chloride (10.8 g., 0.06 mole) was added dropwise with stirring, keeping the temperature between 0° and 5°. The reaction mixture was heated under reflux for 1½ hr., cooled and filtered. The volatile components of the filtrate were distilled off at 10–20 mm. on a steam-bath. The residue was shaken with benzene and 2N-sodium carbonate. The benzene solution was separated, washed with water, and dried over sodium sulphate. The volatile components were distilled off from the dried solution and the residue was crystallized from propan-2-ol giving 2-t-butyl-4,6-dinitrophenyl propyl succinate as pale yellow prisms (18.7 g.), m.p. 51°–2° (Found: N, 7.2, $C_{17}H_{22}N_2O_8$ requires N, 7.3%).

The other alkyl succinates listed in Table II were prepared similarly, using the appropriate alkyl succinyl chlorides.

EXAMPLE 3

Preparation of 2-t-butyl-4,6-dinitrophenyl ethyl oxalate 2-t-Butyl-4,6-dinitrophenol (24.0 g., 0.1 mole), potassium carbonate (7.5 g.) and acetone (75 ml.) were heated under reflux for 30 min. The mixture was cooled to 5° and ethyl oxalyl chloride (15.1 g.) was added dropwise with stirring, keeping the temperature below 15°. The resulting mixture was heated under reflux for 2 hr., cooled and filtered. The filtrate was distilled at 10–20 mm. on a steam-bath and the residue was shaken with a mixture of benzene and 2N-sodium carbonate. The benzene solution was separated, washed with water, and dried over sodium sulphate. The volatile components of the dried solution were distilled off at 10–20 mm. on a steam-bath, and the residue was crystallized from propan-2-ol (50 ml.) to give the title compound (24.5 g.), m.p.83–84° (Found: N, 7.9, $C_{14}H_{16}N_2O_8$ requires N, 8.2%).

2-t-Butyl-4,6-dinitrophenyl methyl oxalate was prepared similarly; its physical properties are shown in Table II.

EXAMPLE 4

Bis-(2-t-butyl-4,6-dinitrophenyl) fumarate 2-t-Butyl-4,6-dinitrophenol (12.0 g.) was heated under reflux with sodium carbonate (2.91 g.) and acetone (40 ml.) for 30 min. Fumaryl chloride (4.21 g.) was added with stirring to the resulting mixture at 0°–5° over 10 min. The stirring was continued for 1 hr. 5 min. The solid was filtered off and washed with water. The remaining solid was dried at 60°, then recrystallized from ethylene dichloride to give bis(2-t-butyl-4,6-dinitrophenyl) fumarate (12.25 g.), m.p. 249°–250° (Found: N,10.0,$C_{24}H_{24}N_4O_{12}$ requires N, 9.5%).

TABLE II

| Name of compounds, 2-t-butyl-4,6-dinitrophenyl ester | Description, solvent of crystallization | M.p., °C | $n_D^{20}$ | Molecular formula | Analysis, percent H Found | Required |
|---|---|---|---|---|---|---|
| Ethyl fumarate | Cream needles, propan-2-ol | 115 | | $C_{16}H_{18}N_2O_8$ | 7.7 | 7.65 |
| n-Propyl fumarate | Pale yellow needles | 89–90 | | $C_{17}H_{20}N_2O_8$ | 7.2 | 7.4 |
| n-Butyl fumarate | Cream prisms, methanol | 71–72 | | $C_{18}H_{22}N_2O_8$ | 7.25 | 7.1 |
| n-Pentyl fumarate | White needles, methanol | 69–70 | | $C_{19}H_{24}N_2O_8$ | 6.9 | 6.9 |
| n-Hexyl fumarate | White prisms, methanol | 64–65 | | $C_{20}H_{26}N_2O_8$ | 6.65 | 6.6 |
| n-Heptyl fumarate | do | 76–77 | | $C_{21}H_{28}N_2O_8$ | 6.5 | 6.4 |
| n-Octyl fumarate | do | 62–63 | | $C_{22}H_{30}N_2O_8$ | 6.3 | 6.2 |
| n-Nonyl fumarate | White needles, methanol | 59–60 | | $C_{23}H_{32}N_2O_8$ | 6.0 | 6.0 |
| n-Decyl fumarate | Cream prisms, methanol and diisopropylether | 50–50.5 | | $C_{24}H_{34}N_2O_8$ | 5.8 | 5.9 |
| n-Undecyl fumarate | Cream needles, methanol | 49–50 | | $C_{25}H_{36}N_2O_8$ | 5.4 | 5.7 |
| n-Dodecyl fumarate | White prisms, methanol | 44–55 | | $C_{26}H_{38}N_2O_8$ | 5.5 | 5.35 |
| Isopropyl fumarate | Cream needles, methanol | 114–115.5 | | $C_{17}H_{20}N_2O_8$ | 7.4 | 7.4 |
| s-Butyl fumarate | Fine cream needles, methanol | 104–105 | | $C_{18}H_{22}N_2O_8$ | 7.2 | 7.1 |
| Isobutyl fumarate | Pale yellow prisms, methanol | 85–86 | | $C_{18}H_{22}N_2O_8$ | 7.2 | 7.1 |

TABLE II – Continued

| Name of compounds, 2-t-butyl-4,6-dinitrophenyl ester | Description, solvent of crystallization | M.p., °C. | $n_D^{20}$ | Molecular formula | Analysis, percent H Found | Analysis, percent H Required |
|---|---|---|---|---|---|---|
| Methyl succinate | Prisms, propan-2-ol | 82.5–83 |  | $C_{15}H_{18}N_2O_8$ | 7.9 | 7.9 |
| Ethyl succinate | Pale yellow prisms, propan-2-ol | 56–57 |  | $C_{16}H_{20}N_2O_8$ | 7.6 | 7.6 |
| n-Propyl succinate | Pale yellow prisms, propan-2-ol | 51–52 |  | $C_{17}H_{22}N_2O_8$ | 7.2 | 7.3 |
| n-Butyl succinate | Orange oil |  | 1.5163 | $C_{18}H_{24}N_2O_8$ | 7.05 | 7.1 |
| Methyl oxalate | Pale yellow prisms, carbon tetrachloride | 148.5–149.5 |  | $C_{13}H_{14}N_2O_8$ | 8.05 | 8.6 |
| Ethyl oxalate | Pale yellow prisms, propan-2-ol | 83–84 |  | $C_{14}H_{16}N_2O_8$ | 7.9 | 8.2 |
| Ethyl adipate | White crystals, propan-2-ol | 70–71 |  | $C_{18}H_{24}N_2O_8$ | 6.5 | 7.1 |
| 2-t-butyl-4,6-dinitrophenyl adipate | White prisms benzene/petrol | 179–180 |  | $C_{26}H_{30}N_4O_{12}$ | 9.5 | 9.82 |

EXAMPLE 5

This example illustrates the herbicidal utility of the compounds of the invention. The compounds were tested for herbicidal activity against common weeds by pre-emergence, incorporation and post-emergence box tests.

The methods of testing the compounds for herbicidal activity were as follows. Control experiments were carried out in all tests.

Pre-emergence box tests

In boxes were sown the following common weeds: shepherds purse (*Capsella bursa pastoris*), groundsel (*Senecio vulgaris*), chickweed (*Stellaria media*), rye grass, annual meadow grass, dock (*Rumex spp.*), fat hen (*Chenopodium album*), and the following crops: cabbage, carrots, wheat, sugar beet, rice.

The compounds to be tested were formulated as follows:

20 g. of the active compound and 10 g. of a blend of non-ionic and ionic emulsifying agents Agrilan A, sold by Lankro Chemicals Limited, were made up to 100 ml. with heavy naphtha. This solution was diluted with the appropriate quantity of water and applied to the boxes at a rate of 4.48 kg. of active compound in 181.6 liters of water per hectare on the day of sowing. Artificial rain equivalent to 6.25 mm was then applied. The containers were kept under glass at about 14°C. and watered as necessary. The effect of this treatment was assessed after 21 days. For determination of the herbicidal activity against weeds, the number of live seedlings of each weed series was assessed and the percentage control was calculated, allowing for natural mortality.

Incorporation box tests 5 cm deep seed trays were filled with soil and were sprayed on the surface with the dilution of the active compound at the rate of 4.48 kg/ha. The soil was then poured through a funnel into a large drum. The lid was placed on the drum and the drum was shaken to mix the soil. The soil was transferred to the trays. In the trays were then sown the standard weeds and the crops listed above, and the effect of the treatment was assessed after 21 days.

Post-emergence box tests

In boxes were sown the standard weeds and the crops listed above. When the seedlings had reached the second true leaf stage (about 2 to 3 weeks), the formulation of the active compounds was diluted with the appropriate quantity of water and applied to the seedlings at the rate of 4.48 kg of the active compound in 363.2 liters of water per hectare.

The results of the herbicidal tests are shown in Table III, wherein the headings "Pre., Incorp., Post." represent pre-emergence, soil incorporation and post-emergence.

Sometimes the number of live seedlings in the treated boxes was greater than that in the untreated boxes. In assessing the control of the individual species, this would have been expressed as no control. It was therefore considered advisable to calculate the "total" percentage control as a percentage on the sum total of the live weed seedlings in the treated containers relative to the untreated containers. These percentage controls may differ considerably from the arithmetical means calculated from the assessments of the controls of the individual species.

TABLE III.—HERBICIDAL ACTIVITY (PERCENT)

|  | Shepherds purse | | | Groundsel | | | Chickweed | | | Rye grass | | |
|---|---|---|---|---|---|---|---|---|---|---|---|---|
|  | Pre. | Incorp. | Post. | Pre. | Incorp. | Post. | Pre. | Incorp. | Post. | Pre. | Incorp. | Post. |
| Alkyl fumarates: | | | | | | | | | | | | |
| Ethyl | 100 | 96 | 100 | 100 | 74 | 100 | 90 | 91 | 100 |  | 61 | 100 |
| Propyl | 100 | 100 | 100 | 71 | 96 | 100 | 60 | 91 | 100 |  | 28 | 84 |
| Butyl | 100 | 100 | 100 | 100 | 91 | 100 | 100 | 76 | 100 | 78 | 89 | 43 |
| Pentyl | 100 | 100 | 100 | 100 | 96 | 100 | 100 | 78 | 100 | 75 | 54 | 53 |
| Hexyl | 100 | 100 | 100 | 100 | 91 | 100 | 100 | 91 | 100 | 58 | 63 | 43 |
| Heptyl | 100 | 100 | 100 | 100 | 96 | 100 | 100 | 83 | 100 | 72 | 47 | 59 |
| Octyl | 100 | 100 | 100 | 100 | 96 | 100 | 100 | 100 | 100 | 72 | 56 | 76 |
| Nonyl | 100 | 85 | 97 | 100 | 68 | 100 | 86 | 38 | 98 | 0 | 14 | 9 |
| Decyl | 100 | 97 | 100 | 100 | 84 | 100 | 97 | 59 | 100 | 0 | 0 | 44 |
| Undecyl | 100 | 87 | 97 | 100 | 84 | 100 | 100 | 55 | 100 | 0 | 0 | 23 |
| Dodecyl | 100 | 85 | 100 | 95 | 26 | 100 | 90 | 86 | 100 | 0 | 0 | 17 |
| Isopropyl | 100 | 96 | 100 | 96 | 91 | 100 | 100 | 87 | 99 | 19 | 25 | 6 |
| Sec-butyl | 100 | 96 | 100 | 100 | 83 |  | 96 | 44 | 90 | 40 | 0 | 7 |
| Isobutyl | 100 | 100 | 100 | 100 | 95 | 100 | 97 | 86 | 100 | 14 | 0 | 37 |
| Alkyl succinates: | | | | | | | | | | | | |
| Methyl | 100 | 96 | 100 | 98 | 96 | 100 | 88 | 74 | 100 |  | 49 | 72 |
| Ethyl | 100 | 96 | 100 | 100 | 87 | 100 | 93 | 91 | 100 | 39 | 54 | 50 |
| Propyl | 100 | 100 | 100 | 100 | 91 | 100 | 100 | 89 | 100 | 67 | 54 | 40 |
| Butyl | 100 | 100 | 100 | 100 | 96 | 100 | 100 | 91 | 100 | 61 | 44 | 80 |
| Alkyl oxalates: | | | | | | | | | | | | |
| Methyl | 100 | 100 | 100 | 72 | 95 | 100 | 93 | 100 | 100 |  | 14 | 62 |
| Ethyl | 100 | 100 | 100 | 100 | 96 | 100 | 95 | 91 | 100 |  | 67 | 95 |
| Alkyl adipate: Ethyl | 100 | 100 | 100 |  | 87 | 100 |  | 74 | 100 |  | 11 | 45 |

TABLE III.—HERBICIDAL ACTIVITY (PERCENT) – Continued

|  | Annual meadow grass | | | Dock | | | Fat hen | | | Total control | | |
| --- | --- | --- | --- | --- | --- | --- | --- | --- | --- | --- | --- | --- |
|  | Pre. | Incorp. | Post. | Pre. | Incorp. | Post. | Pre. | Incorp. | Post. | Pre. | Incorp. | Post. |
| Alkyl fumarates: | | | | | | | | | | | | |
| Ethyl | 41 | | | 76 | | | | | | 89 | 76 | 100 |
| Propyl | 1 | | | 83 | | | 100 | | | 80 | 66 | 91 |
| Butyl | | | | | | | | | | 97 | 87 | 90 |
| Pentyl | | | | | | | | | | 89 | 75 | 72 |
| Hexyl | | | | | | | | | | 81 | 81 | 62 |
| Heptyl | | | | | | | | | | 87 | 73 | 74 |
| Octyl | | | | | | | | | | 87 | 80 | 86 |
| Nonyl | | | | | | | | | | 88 | 62 | 75 |
| Decyl | | | | | | | | | | 87 | 72 | 82 |
| Undecyl | | | | | | | | | | 91 | 67 | 80 |
| Dodecyl | | | | | | | | | | 86 | 63 | 73 |
| Isopropyl | | | | | | | | | | 63 | 62 | 46 |
| Sec-butyl | | | | | | | | | | 73 | 41 | 67 |
| Isobutyl | | | | | | | | | | 93 | 87 | 83 |
| Alkyl succinates: | | | | | | | | | | | | |
| Methyl | 16 | | | 100 | | | 100 | | | 98 | 71 | 83 |
| Ethyl | | | | | | | | | | 71 | 75 | 69 |
| Propyl | | | | | | | | | | 85 | 76 | 63 |
| Butyl | | | | | | | | | | 83 | 73 | 70 |
| Alkyl oxalates: | | | | | | | | | | | | |
| Methyl | 0 | | | 82 | | | 90 | | | 87 | 93 | 87 |
| Ethyl | 53 | | | 65 | | | 100 | | | 89 | 83 | 97 |
| Alkyl adipate: Ethyl | | | | | | | | | | | 53 | 69 |

Table IV tabulates the phytotoxicity of the compounds against some common crops, representing the ratio of the fresh weight of the treated plants to the fresh weight of the untreated plants, expressed as a percentage. Thus 100 indicates no phytotoxicity and 0 indicates crop death.

TABLE IV.—PHYTOTOXICITY

|  | Pre-emergence box tests | | | | | | | | Post emergence box tests Rice | | |
| --- | --- | --- | --- | --- | --- | --- | --- | --- | --- | --- | --- |
|  | Cabbage | | Carrots | | Wheat | | Sugar beet | | | | |
| R | 2.24 kg./ha. | 4.48 kg./ha. | 2.24 kg./ha. | 4.48 kg./ha. | 2.24 kg./ha. | 4.48 kg./ha. | 2.28 kg./ha. | 4.48 kg./ha. | 1.68 kg./ha. | 3.36 kg./ha. | 5.03 kg./ha. |
| Fumarates: | | | | | | | | | | | |
| Ethyl | 0 | 0 | 10 | 41 | 100 | 100 | 100 | 100 | 97 | 89 | 55 |
| Propyl | 12 | 1 | 92 | 100 | 100 | 100 | 100 | 100 | | 100 | 96 |
| Succinate: | | | | | | | | | | | |
| Methyl | 0 | 18 | 69 | 18 | 100 | 100 | 100 | 100 | 86 | 86 | 16 |
| Oxalates: | | | | | | | | | | | |
| Methyl | 0 | 0 | 95 | 36 | 100 | 100 | 100 | 100 | 21 | 0 | 0 |
| Ethyl | 12 | 16 | 46 | 44 | 100 | 100 | 100 | 100 | | 0 | 0 |
| Adipate: Ethyl | 50 | 12 | 95 | 85 | 100 | 100 | 100 | 1000 | 85 | 75 | 13 |

EXAMPLE 6

This example demonstrates the insecticidal activity of the compounds of the invention.

The following test insects were used:
Boophilus decoloratus—the blue tick
Lucilia sericata—the blow fly responsible for 'strike' in sheep
Aedes aegypti—the mosquito vector of yellow fever
Musca domestica—the common house fly Each insect necessitated the use of a different mode of testing, as follows:

1. *Boophilus decoloratus*, blue tick larvae, are held for 24 hours in close contact with a 0.1 percent solution of the substance under test, absorbed on filter paper, after which time mortality is assessed.

2. Two tests are carried out against *Lucilia sericata*, both using 1st instar larvae. In one, an in vitro method, larvae are exposed to a 0.1 percent solution, absorbed on cotton wool rolls, and given horse serum for food, assessment being after 24 hours. The second method entails inducing a fly-strike on guinea pigs which are then dosed orally with the compound. Systemic activity is assessed by noting the time taken to repel larvae from the strike.

3. Compounds are screened against immature *Aedes aegypti*; third to fourth instar larvae in water are treated with 10 ppm for 24 hours.

4. Female house flies, (*Musca domestica*,) are used, (the males are more susceptible). These are dosed topically with 1 µl of a 0.1 percent solution. Mortality is assessed after 24 hours.

The results of testing a variety of the compounds of the invention on the four above-mentioned insects are shown in Table V. The abbreviation MLC stands for minimum lethal concentration.

TABLE V.—INSECTICIDAL ACTIVITY

| Ester of 2-t-butyl 4,6-dinitro-phenol | Aedes aegypti larvae | Boophilus decoloratus larvae | Lucilia sericata larvae | Musca domestica | Mammalian toxicity (mice) in mg./kg. |
| --- | --- | --- | --- | --- | --- |
|  | MLC, p.p.m. | MLC, percent | MLC, percent | $LD_{50}$, percent | Acute oral $LD_{50}$-approx. |
| Ethyl oxalate | 10 | 0.0007 | 0.006 | 0.04 | 100 |
| Ethyl fumarate | 10 | 0.003 | 0.0125 | 0.04 | 400 |
| Butyl fumarate | 10 | 0.025 | <0.006 | 0.04 | 400 |
| Pentyl fumarate | 10 | 0.025 | 0.0125 | 0.04 | 200 |
| Hexyl fumarate | 10 | 0.05 | 0.006 | 0.04 | >1,600 |
| Heptyl fumarate | 10 | 0.05 | 0.006 | 0.05 | >1,600 |
| Octyl fumarate | 10 | 0.05 | 0.0125 | 0.06 | >1,600 |
| Sec-butyl fumarate | 10 | 0.1 | 0.0125 | 0.04 | 400 |
| Dodecyl fumarate | 10 | 0.1 | 0.006 | 0.06 | >1,600 |
| Isobutyl fumarate | 10 | 0.1 | <0.006 | <0.1 | 800 |

TABLE V.—INSECTICIDAL ACTIVITY – Continued

| Ester of 2-t-butyl 4,6-dinitrophenol | Aedes aegypti larvae MLC, p.p.m. | Boophilus decoloratus larvae MLC, percent | Lucilia sericata larvae MLC, percent | Musca domestica LD$_{50}$, percent | Mammalian toxicity (mice) in mg./kg. Acute oral LD$_{50}$- approx. |
|---|---|---|---|---|---|
| Decyl fumarate | 10 | 0.1 | <0.006 | <0.1 | >1,600 |
| Nonyl fumarate | 10 | 0.1 | 0.0125 | <0.1 | >1,600 |
| Undecyl fumarate | 10 | 0.1 | 0.0125 | <0.1 | >1,600 |
| Bis fumarate | 10 | 0.002 | 0.041 | | 1,600 |
| Methyl succinate | 10 | 0.006 | 0.0125 | 0.04 | 100 |
| Ethyl succinate | 10 | 0.025 | <0.006 | 0.04 | 50 |
| Butyl succinate | 10 | 0.1 | 0.006 | 0.04 | 50 |
| Propyl succinate | 10 | 0.1 | <0.006 | 0.05 | 50 |
| Ethyl adipate | 10 | 0.025 | 0.006 | 0.1 | 400 |

The ethyl oxalate ester was tested against *Blatella germanica* and found to have a minimum lethal concentration of 536 mg/sq.m.

EXAMPLE 7

The nematicidal activity of the compounds of the invention was tested against Panagrellus, a free-living nematode. The test procedure was as follows:

Panagrellus was cultured on an oatmeal medium and the nematodes, of all age groups, were suspended in water to form a concentrated suspension. 1 ml of this suspension was added to an aqueous medium containing one of a number of test compounds at a concentration of 500 ppm. This suspension was then further diluted as required to give concentrations of test compound of 300, 100 and 30 ppm.

After 48 hours the dead and live nematodes were counted visually under a microscope. The percentage control was then assessed, after allowing for natural mortality.

The results are shown in Table VI.

TABLE VI

| Ester of 2-t-butyl-4,6-dinitrophenol | % control at (ppm) | | |
|---|---|---|---|
| | 300 | 100 | 30 ppm |
| Fumarates | | | |
| Ethyl | 80 | 15 | 0 |
| n-Propyl | 60 | 25 | 10 |
| n-Butyl | 90 | 70 | 15 |
| Pentyl | 100 | 100 | 60 |
| Hexyl | 100 | 95 | 40 |
| Heptyl | 100 | 100 | 50 |
| Octyl | 100 | 100 | 25 |
| Isopropyl | 100 | 100 | 20 |
| Succinates | | | |
| Methyl | 80 | 75 | 60 |
| Ethyl | 100 | 95 | 46 |
| n-Propyl | 100 | 100 | 95 |
| n-Butyl | 100 | 100 | 65 |
| Oxalates | | | |
| Ethyl | 95 | 95 | 35 |

EXAMPLE 8

Compounds according to the invention were tested for activity against root knot nematodes (*Meliodogyna spp*) and stem nematodes (*Ditylenchus dipsaci*).

The compounds were applied by soil incorporation just before planting seeds of the test plants (cucumber for root knot nematode, and alfalfa for stem nematode). The test plants were assessed for disease incidence two weeks after planting.

The effectiveness of each compound is indicated in Table VII on an arbitrary scale running from 5 (100 percent control) to 1 (No control of disease), while (—) indicates that the plant died or was severely injured and a reading was not possible.

TABLE VII

| Ester of 2-tert. butyl-4,6-dinitrophenol | Activity Rating | |
|---|---|---|
| | Root nematode (22.4 kg/ha) | Stem nematode (44.8 kg/ha) |
| Fumarates: | | |
| n-Pentyl | 5 | 3 |
| n-Hexyl | 4 | (—) |
| n-Octyl | 5 | 5 |
| n-Undecyl | 5 | (—) |
| 2-tert-butyl-4,6-dinitrophenyl | 5 | 4 |
| Succinates: | | |
| Ethyl | 5 | 5 |
| Adipates: | | |
| Ethyl | 5 | 1 |
| 2-tert-butyl-4,6-dinitrophenyl | 4 | 1 |

EXAMPLE 9

The activity of the compounds according to the invention was tested against *Aphis fabae* by contact application, the host plant being broad beans. Treatment was applied by a dipping technique, and the percent control was assessed 48 hours after treatment. The results are shown in Table VIII.

TABLE VIII

| Ester of 2-tert-butyl-4,6-dinitrophenol | % control at (ppm) | |
|---|---|---|
| | 300 | 100 |
| Fumarates: | | |
| Isopropyl | 90 | 85 |
| n-Butyl | 83 | 58 |
| n-Hexyl | 75 | 38 |
| n-Heptyl | 77 | 66 |
| n-Octyl | 75 | 68 |
| Succinates: | | |
| Ethyl | 90 | 84 |
| n-Propyl | 97 | 74 |
| n-Butyl | 92 | 54 |

EXAMPLE 10

The activity of compounds according to the invention was tested against schradan-resistant red spider, *Tetranychus telarius*. Treatment was applied by a dipping technique and the percent control was assessed 48 hours after treatment. The results are shown in Table IX.

TABLE IX

| Ester of 2-tert-butyl-4,6-dinitrophenol | % Control at (ppm) | | | |
|---|---|---|---|---|
| | 300 | 100 | 30 | 10 |
| Fumarates: | | | | |
| Isopropyl | 100 | 77 | | |
| n-Butyl | 100 | 94 | | |
| Isobutyl | | 98 | 96 | 57 |
| n-Hexyl | 98 | 61 | | |
| n-Heptyl | 89 | 46 | | |
| n-Octyl | 72 | 30 | | |
| Dodecyl | | 77 | 80 | 63 |
| Succinates: | | | | |
| Ethyl | 100 | 100 | 94 | 94 |
| n-Propyl | 100 | 100 | 99 | 85 |
| n-Butyl | 100 | 100 | 88 | 82 |
| Adipate: | | | | |
| Ethyl | 99 | 69 | | |

EXAMPLE 11

The activity of the compounds of the invention was tested against the Mexican bean beetle (*Epilachna Varivestis*) by a stomach poison test.

The host plants were sprayed with a formulation of the compound at the desired concentration, allowed to dry, and subsequently infested with the test insects. The percentage control was assessed after 48 hours. The results are shown in Table X.

TABLE X

| Ester of 2-tert.butyl-4,6-dinitrophenol | % Control at (ppm) | | | | | |
|---|---|---|---|---|---|---|
| | 1000 | 500 | 250 | 100 | 50 | 25 |
| Fumarates: | | | | | | |
| Ethyl | 99 | 99 | 98 | 78 | 98 | 77 |
| n-Pentyl | 99 | 99 | 99 | 99 | 0 | 20 |
| n-Hexyl | 99 | 99 | 99 | 99 | 0 | 0 |
| n-Heptyl | 89 | 98 | 99 | 99 | 99 | |
| n-Octyl | | 99 | 77 | 99 | 99 | |
| n-Undecyl | | 99 | 99 | 99 | 99 | |
| Succinate: | | | | | | |
| Ethyl | 98 | 99 | 99 | 99 | 77 | 0 |
| Adipate: | | | | | | |
| Ethyl | | 98 | 89 | 81 | | |

EXAMPLE 12

The compounds of the invention were tested for activity against the Two Spotted spider mite (*Tetranychus urticae*)

The mites were sprayed with a formulation of the toxicant in a co-solvent, wetting powder and water, at the desired concentration. A standard spray tower and an atomizer sprayer were used. The percentage mortality of the test mites was assessed 48 hours after treatment. The results are shown in Table XI.

TABLE XI

| Ester of 2-tert.butyl-4,6-dinitrophenol | % Control at (ppm) | | | | | |
|---|---|---|---|---|---|---|
| | 1000 | 500 | 250 | 100 | 50 | 25 |
| Fumarates: | | | | | | |
| Ethyl | 99 | 99 | 89 | 99 | 45 | 78 |
| n-Pentyl | 99 | 99 | 99 | 66 | 56 | 88 |
| n-Hexyl | 99 | 99 | 99 | 88 | 65 | 76 |
| n-Heptyl | 99 | 99 | 99 | 89 | 97 | |
| n-Octyl | 99 | 88 | 78 | 99 | 82 | |
| n-Undecyl | 99 | 99 | 89 | 89 | 87 | |
| Succinate: | | | | | | |
| Ethyl | 99 | 99 | 99 | 98 | 55 | |

EXAMPLE 13

The compounds of the invention were tested for activity against the Milkweed bug (*Oncopeltis fasciatus*) by the method employed in Example 12. The results are shown in Table XII.

TABLE XIII

| Ester of 2-tert.butyl-4,6-dinitrophenol | % Control at (ppm) | | | | |
|---|---|---|---|---|---|
| | 1000 | 500 | 250 | 100 | 50 |
| Fumarates: | | | | | |
| Ethyl | 99 | 96 | 52 | 82 | 52 |
| n-Pentyl | 99 | 89 | 99 | 98 | 51 |
| n-Hexyl | 99 | 99 | 99 | 33 | 10 |
| n-Octyl | 89 | 79 | 32 | 21 | 20 |
| n-Undecyl | 99 | 99 | 98 | 98 | 67 |
| Succinates: | | | | | |
| Ethyl | 99 | 99 | 95 | 82 | 30 |
| Adipate: | | | | | |
| Ethyl | 99 | 11 | 20 | | |

I claim:
1. A compound selected from the group consisting of the compounds of the formula

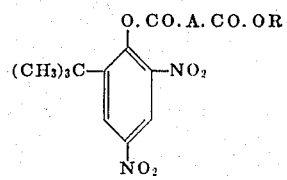

in which A is chosen from the group consisting of —CH=CH— and —(CH$_2$)$_n$— where $n$ is chosen from the group consisting of 0 and integers from 1 to 6, and R is a group chosen from the group consisting of alkyl groups having 1 to 18 carbon atoms, with the proviso that R is not methyl when A is —CH=CH—.

2. Compounds as claimed in claim 1 in which the group R is selected from the group consisting of alkyl groups having 1 to 12 carbon atoms.

3. Compounds as claimed in claim 1 wherein said compound is 2-t-butyl-4,6-dinitrophenyl n-butyl succinate.

4. Compounds as claimed in claim 1 wherein said compound is 2-t-butyl-4,6-dinitrophenyl methyl oxalate.

5. Compounds as claimed in claim 1 wherein said compound is 2-t-butyl-4,6-dinitrophenyl ethyl oxalate.

6. Compounds as claimed in claim 1 wherein said compound is 2-t-butyl-4,6-dinitrophenyl ethyl fumarate.

7. Compounds as claimed in claim 1 wherein said compound is 2-t-butyl-4,6-dinitrophenyl propyl fumarate.

8. Compounds as claimed in claim 1 wherein said compound is 2-t-butyl-4,6-dinitrophenyl isopropyl fumarate.

9. Compounds as claimed in claim 1 wherein said compound is 2-t-butyl-4,6-dinitrophenyl n-butyl fumarate.

10. Compounds as claimed in claim 1 wherein said compound is 2-t-butyl-4,6-dinitrophenyl isobutyl fumarate.

11. Compounds as claimed in claim 1 wherein said compound is 2-t-butyl-4,6-dinitrophenyl pentyl fumarate.

12. Compounds as claimed in claim 1 wherein said compound is 2-t-butyl-4,6-dinitrophenyl hexyl fumarate.

13. Compounds as claimed in claim 1 wherein said compound is 2-t-butyl-4,6-dinitrophenyl heptyl fumarate.

14. Compounds as claimed in claim 1 wherein said compound is 2-t-butyl-4,6-dinitrophenyl octyl fumarate.

15. Compounds as claimed in claim 1 wherein said compound is 2-t-butyl-4,6-dinitrophenyl decyl fumarate.

16. Compounds as claimed in claim 1 wherein said compounds is 2-t-butyl-4,6-dinitrophenyl methyl succinate.

17. Compounds as claimed in claim 1 wherein said compound is 2-t-butyl-4,6-dinitrophenyl n-propyl succinate.

* * * * *